United States Patent [19]

Krause et al.

[11] 4,229,315
[45] Oct. 21, 1980

[54] LIQUID CRYSTALLINE CYCLOHEXANE DERIVATIVES

[75] Inventors: Joachim Krause; Rudolf Eidenschink, both of Dieburg; Ludwig Pohl, Darmstadt, all of Fed. Rep. of Germany

[73] Assignee: Merck Patent Gesellschaft mit beschrankter Haftung, Darmstadt, Fed. Rep. of Germany

[21] Appl. No.: 1,084

[22] Filed: Jan. 5, 1979

[30] Foreign Application Priority Data

Jan. 7, 1978 [DE] Fed. Rep. of Germany ....... 2800553

[51] Int. Cl.$^3$ .......................... C09K 3/34; C02F 1/13; C07C 69/76; C07C 69/74; C07C 121/52
[52] U.S. Cl. .................... 252/299; 252/408; 350/350 R; 260/465 R; 260/465 D; 260/465 F; 260/465.1; 260/465.4; 560/1; 560/59; 560/73; 560/102; 560/106; 560/107; 560/118; 560/126; 560/141
[58] Field of Search ................ 252/299, 408; 350/350; 560/1, 73, 102, 107, 106, 118, 126, 141, 59; 260/465 D, 465 R, 465 F, 465.1, 465.4

[56] References Cited

U.S. PATENT DOCUMENTS

| | | | |
|---|---|---|---|
| 3,951,846 | 4/1976 | Gavrilovic | 252/299 |
| 4,013,582 | 3/1977 | Gavrilovic | 252/299 |
| 4,017,416 | 4/1977 | Inukai et al. | 252/299 |
| 4,029,595 | 6/1977 | Ross et al. | 252/299 |
| 4,065,489 | 12/1977 | Steinstrasser et al. | 252/299 |
| 4,112,239 | 9/1978 | DuBois et al. | 252/299 |
| 4,113,647 | 9/1978 | Coates et al. | 252/299 |
| 4,118,335 | 10/1978 | Krause et al. | 252/299 |
| 4,130,502 | 12/1978 | Eidenschink et al. | 252/299 |
| 4,149,413 | 4/1979 | Gray et al. | 252/299 |
| 4,154,697 | 5/1979 | Eidenschink et al. | 252/299 |

FOREIGN PATENT DOCUMENTS

| | | | |
|---|---|---|---|
| 2752975 | 8/1978 | Fed. Rep. of Germany | 252/299 |
| 105701 | 5/1974 | German Democratic Rep. | 252/299 |
| 132591 | 10/1978 | German Democratic Rep. | 252/299 |

OTHER PUBLICATIONS

Eidenschink, R., et al., Angew, Chem., vol. 89, p. 103 (1977).
Karamysheva, L. A., et al., Mol. Cryst. Viq. Cryst., vol. 37, pp. 29-34 (1976).
Coates, D. et al., Mol. Cryst. Lia. Cryst., vol. 31, pp. 275-283 (1975).
Dewar, M. J. S., et al., J. Am. Chem. Soc., vol. 92, No. 6, pp. 1582-1586 (1970).

Primary Examiner—Teddy S. Gron
Attorney, Agent, or Firm—Millen & White

[57] ABSTRACT

Cyclohexane derivatives of the formula

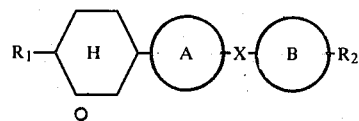

wherein the rings A and B are identical or different and are each a 1,4-disubstituted phenyl or cyclohexyl ring; X is —CO—O— or —O—CO—; $R_1$ is alkyl of 1-8 carbon atoms; and $R_2$ is alkyl of 1-8 carbon atoms, and when the ring B is phenyl, $R_2$ is alkyl, alkoxy or alkanoyloxy, each of up to 8 carbon atoms, or —CN, have valuable liquid crystalline properties.

12 Claims, No Drawings

LIQUID CRYSTALLINE CYCLOHEXANE DERIVATIVES

BACKGROUND OF THE INVENTION

The present invention relates to cyclohexane derivatives, processes for their preparation and their use as constituents of liquid crystalline materials, especially of dielectrics for liquid crystal display elements.

For liquid crystal display elements, the properties of nematic or nematic-cholesteric liquid crystalline materials are utilized to effect a significant change in their optical properties, such as light transmission, light scattering, double refraction, reflectance or color under the influence of electric fields. The action of such display elements is based, for example, on the phenomenon of dynamic scattering, the deformation of aligned phases (electrically controlled optical birefringence) or the Schadt-Helfrich effect in the twisted cell.

For industrial application of these effects in liquid crystal display elements, liquid crystalline materials are required which have to meet a large number of requirements. Particularly important requirements are their chemical stability towards moisture, air and physical influences, such as heat, radiation in the infrared, visible and ultraviolet ranges and electrical continuous and alternating fields. Furthermore, a liquid crystal mesophase in the temperature range from at least 0° C. to +60° C., preferably from −20° C. to +80° C., and a viscosity at room temperature of not more than 70 cP are demanded for liquid crystalline materials which can be used industrially. Finally, these materials must not have any characteristic absorption in the range of visible light, i.e., they must be colorless.

A number of liquid crystalline compounds which meet the stability requirements demanded of dielectrics for electronic components and which are also colorless are already known. These include, in particular, the p,p'-disubstituted phenyl benzoates described in German Offenlegungsschrift No. 2,139,628 and the p,p'-disubstituted biphenyl derivatives described in German Offenlegungsschrift No. 2,356,085. In both classes of compounds and also in other known series of compounds having a liquid crystal mesophase, there are no individual compounds which form a liquid crystal nematic mesophase in the required temperature range of from 0° C. to 60° C. Therefore, as a rule, mixtures of two or more compounds are prepared in order to obtain substances which can be used as liquid crystal dielectrics. For this purpose, usually at least one compound having a low melting point and clear point is mixed with another compound having a significantly higher melting point and clear point. This usually gives a mixture which has a melting point at a temperature lower than or about the same as the melting point of the component having a lower melting point, while the clear point is between the clear points of the components.

Components having higher melting points and clear points which have been used hitherto are, for example, 4,4'''-disubstituted phenyl p-benzoyloxybenzoates of the formula (II)

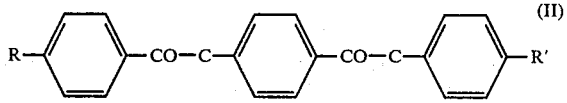

or the biphenyl ester derivatives of the formula (III)

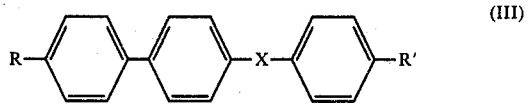

in which formulae R and R' are alkyl or alkoxy and X is carbonyloxy. The compounds of the formula (II) have not, however, found a wide field of application because they impart a high viscosity to the liquid crystal dielectrics containing them. As a result, the switching times of the liquid crystal display elements prepared with these compounds are prolonged in an undesirable manner. It is true that this effect is not observed when the biphenyl esters of formula (III) are used, but these compounds, in particular at low temperatures, are not readily soluble in the most important liquid crystalline base materials, as is desirable if the clear point is to be raised.

Other liquid crystalline compounds are also known, e.g., the phenylcyclohexanes disclosed in Eidenschink et al, Angew. Chem. 89 (1977) 103 and Pohl et al, Phys. Letters 60A (1977) 103. (See also U.S. Pat. No. 4,130,502.) Other cyclohexyl-containing liquid crystalline compounds are disclosed in U.S. Pat. Nos. 4,029,595 and 4,013,582, as well as U.S. patent application Ser. No. 868,580, filed on Jan. 11, 1978 and Ser. No. 868,573, filed on Jan. 11, 1978, now allowed.

SUMMARY OF THE INVENTION

Accordingly, it is an object of this invention to provide novel liquid crystalline compounds having the desirable properties mentioned above.

Upon further study of the specification and appended claims, further objects and advantages of this invention will become apparent to those skilled in the art.

These objects have been achieved by providing cyclohexane derivatives of the formula (I)

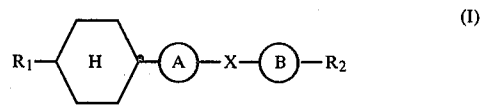

wherein
the rings A and B are identical or different and are each a 1,4-disubstituted phenyl or cyclohexyl ring;
X is —CO—O— or —O—CO—;
$R_1$ is alkyl of 1–8 carbon atoms;
and $R_2$ is alkyl of 1–8 carbon atoms,
and when ring B is phenyl, $R_2$ is alkyl, alkoxy or alkanoyloxy, all of up to 8 carbon atoms or —CN.

These compounds are outstandingly suitable as mixing components for liquid crystal dielectrics.

DETAILED DISCUSSION

The cyclohexane derivatives of formula (I) have melting points and clear points in temperature ranges similar to those of the analogous biphenyl esters. However, in some liquid crystal base materials, such as, for example, the phenylcyclohexane derivatives of U.S. Pat. No. 4,130,502, they are considerably more readily soluble than the biphenyl esters. As a result, it is possible to prepare dielectrics for liquid crystal display elements which consist of a smaller number of components than dielectrics with comparable properties which have been used hitherto.

It has furthermore been found that in dielectrics for liquid crystal display elements which contain at least one cyclohexane derivative of formula (I), the temperature dependence of the threshold voltage is particularly low. This characteristic is essential for liquid crystal display elements with a high information packing density, especially for those which operate in multiplex mode.

This invention thus relates to the cyclohexane derivatives of formula (I) and to processes for their preparation. This invention further relates to the use of the cyclohexane derivatives of formula (I) in mixtures with other liquid crystalline substances as dielectrics in liquid crystal display elements.

This invention also relates to dielectrics for liquid crystal display elements which contain at least two liquid crystal components, at least one of which is a cyclohexane derivative of formula (I).

Preferred groups of cyclohexane derivatives of formula (I) are those of formulae (Ia) to (Id), i.e., phenyl 4-(4-alkylcyclohexyl)-benzoates and para-substituted 4-(4-alkylcyclohexyl)-phenyl benzoates of formula (Ia):

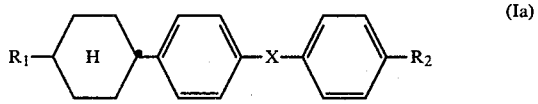
(Ia)

4-alkylcyclohexyl 4-(4-alkylcyclohexyl)-benzoates and 4-(4-alkylcyclohexyl)-phenyl 4-alkyl-cyclohexanecarboxylates of formula (Ib):

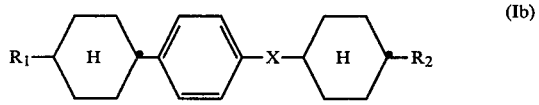
(Ib)

phenyl 4-(4-alkylcyclohexyl)-cyclohexanecarboxylates and parasubstituted 4-(4-alkylcyclohexyl)-cyclohex-1-yl benzoates of formula (Ic):

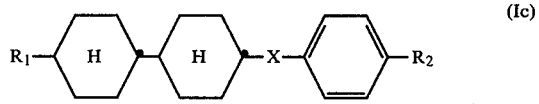
(Ic)

and
4-alkylcyclohexyl 4-(4-alkylcyclohexyl)-cyclohexanecarboxylates and 4-(4-alkylcyclohexyl)-cyclohex-1-yl 4-alkylcyclohexanecarboxylates of formula (Id):

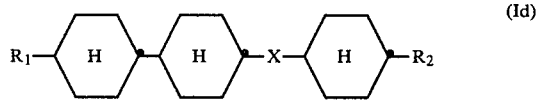
(Id)

In these formulae (Ia) to (Id), $R_1$, $R_2$ and X are as defined in formula (I). In all of the cyclohexane derivatives according to this invention of formulae (I) and (Ia) to (Id), the particular substituents in the 1- and 4-positions of the cyclohexane rings are located in the trans-position; in the structural formulae this is symbolized by the black mark on the right-hand side of the cyclohexane rings.

The cyclohexane derivatives of this invention of formula (I) in which X is —CO—O— are prepared from particularly readily accessible starting materials and are therefore preferred.

The substituent $R_1$ in the compounds of formula (I) can be straight-chain or branched. If $R_1$ is straight-chain, i.e., methyl, ethyl, n-propyl, n-butyl, n-pentyl, n-hexyl, n-heptyl or n-octyl, the corresponding compounds of formula (I) as a rule have particularly high clear points. The compounds of formula (I) in which $R_1$ is alkyl of 1-7, and preferably of 1-6 carbon atoms are particularly preferred. However, compounds of formula (I) containing branched substituents as $R_1$ are also important, since these frequently have better solubility properties in the customary liquid crystal base mixtures. Such substituents $R_1$ which are not straight-chain preferably contain not more than one chain branch. Preferred branched substituents are those in which the carbon chain is branched at the linking carbon atom or one of the two adjacent carbon atoms. Among these substituents, important branched groups are those in which a methyl or ethyl group is located in the 1-, 2- or 3-position of a longer carbon chain, for example, isopropyl, 1-methylpropyl, 2-methylpropyl, 1-methylbutyl, 2-methylbutyl, 3-methylbutyl, 1-methylpentyl, 1-ethylpentyl, 2-methylpentyl, 1-methylhexyl, 2-ethylhexyl or 1-methylheptyl.

When the substituent $R_2$ in the compounds of formula (I) is alkyl, the foregoing discussion of suitable substituents for $R_1$ applies to $R_2$. Analogously, this discussion also applies to $R_2$ with respect to the alkyl portion of the alkoxy or alkanoyloxy groups located on the phenyl ring B, the alkyl portion of the $C_{1-8}$ alkanoyloxy groups, of course, having not more than 7 carbon atoms. Preferably, however, the compounds of formula (I) contain not more than one substituent with a branched carbon chain. Cyclohexane derivatives of this invention which are of the greatest importance are those in which the two end groups $R_1$ and $R_2$ contain straight-chain carbon chains. If the ring B is a phenyl ring, the compounds containing the cyano group as the end group $R_2$ are particularly preferred.

The cyclohexane derivatives of this invention are prepared by standard processes which are frequently described in the literature for carboxylic acid esters. Preferably, the new compounds are prepared by reacting a cyclohexane compound of formula (IV)

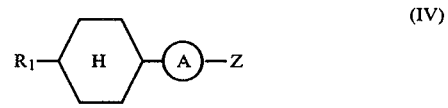
(IV)

in which Z is OH, OMe, COOH or a reactive derivative of the carboxyl group and Me is an equivalent of a metal cation, at a temperature between $-50°$ C. and $+250°$ C., optionally in the presence of an organic solvent and/or of a conventional esterification catalyst, with a compound of the general formula (V)

(V)

in which Z' is COOH or a reactive derivative of the carboxyl group if Z is OH or OMe and Z' is OH or OMe if Z is COOH or a reactive carboxyl group derivative.

4-(4-R₁-Cyclohexyl)-benzoic acid esters or 4-(4-R₁-cyclohexyl)-cyclohexane-carboxylic acid esters are obtained if Z is COOH or a reactive derivative thereof, preferably —CO—halogen, especially —COCl, —COO-lower alkyl, especially —COOCH₃, or an anhydride grouping, preferably a mixed anhydride, such as, for example, —COOCOCH₃. The group Z' in the compound of formula (V) in this case is a hydroxyl group or an alcoholate group, preferably an alkali metal alcoholate or an alkaline earth metal alcoholate group.

The reaction conditions for the process of this invention are substantially determined by the nature of the groups Z and Z'. Thus, a carboxylic acid is reacted with an alcohol (Z, Z'=COOH, OH) as a rule in the presence of a strong acid, for example, a mineral acid, such as hydrochloric acid or sulphuric acid. A preferred reaction procedure is the reaction of an acid anhydride or, in particular, of an acid chloride with an alcohol (Z,Z'=COCl, OH). Preferably, these esterification reactions are carried out in an alkaline medium and important bases are, in particular, alkali metal hydroxides, such as sodium hydroxide or potassium hydroxide, alkali metal carbonates and alkali metal bicarbonates, such as sodium carbonate, sodium bicarbonate, potassium carbonate or potassium bicarbonate, alkali metal acetates, such as sodium acetate or potassium acetate, alkaline earth metal hydroxides, such as calcium hydroxide, or organic bases, such as triethylamine, pyridine, lutidine, collidine or quinoline.

The esterification reactions are advantageously carried out in the presence of an inert solvent. Solvents which are very suitable include, in particular, ethers such as diethyl ether, di-n-butyl ether, tetrahydrofuran, dioxane or anisole, ketones such as acetone, butanone, pentan-3-one or cyclohexanone, amides such as dimethylformamide or hexamethylphosphoric acid triamide, hydrocarbons such as benzene, toluene or xylene, halogenated hydrocarbons such as carbon tetrachloride or tetrachloroethylene, and sulphoxides such as dimethylsulphoxide or sulpholane. Water-immiscible solvents can at the same time advantageously be used for the removal, by azeotropic distillation, of the water formed during the esterification reaction. An excess of an organic base used, for example pyridine, quinoline or triethylamine, can sometimes also be employed as the solvent for the esterification reaction. In principle, the esterification reactions of this invention can also be carried out in the absence of a solvent, for example, by simply heating the components in the presence of sodium acetate.

The reaction temperature is usually between −50° C. and +250° C. and preferably between −20° C. and +80° C. At these temperatures, the esterification reactions as a rule end after 15 minutes to 48 hours.

A further preferred embodiment of the process of this invention comprises first converting the alcohol of the formula IV or V (Z or Z'=OH), which is to be esterified, to its sodium or potassium salt, for example, by treatment with ethanolic sodium hydroxide solution or potassium hydroxide solution; isolating this salt and suspending it together with sodium bicarbonate or potassium carbonate in acetone or diethyl ether, with stirring; and adding a solution of an acid chloride or anhydride in diethyl ether, acetone or dimethylformamide dropwise to this suspension, with stirring. The reaction mixture is kept at a temperature between −25° C. and +20° C., preferably at −10° C. to −20° C. With this procedure, the esterification reaction usually ends after 15 to 50 minutes.

The starting materials for the preparation of the cyclohexane derivatives of this invention are known in some cases, such as, for example, the alcohols or carboxylic acids of formula (V), which are substituted in the 4-position. In some cases, they can be prepared without difficulty by standard processes of organic chemistry from compounds known from the literature. Thus, for example, the carboxylic acids of formula (IV) (Z=COOH) are intermediate products in the syntheses of the phenylcyclohexanes and cyclohexylcyclohexanes described in U.S. patent applications Ser. Nos. 823,308, filed on Aug. 10, 1977, now U.S. Pat. No. 4,130,502, and 868,580, filed on Jan. 11, 1978, now allowed.

The 4-(4-R₁-cyclohexyl)-phenols of formula (IV) (Z=OH) can be prepared, for example, by reacting the corresponding 4-R₁-cyclohexanones with 4-methoxyphenyl-magnesium bromide; subjecting the reaction product to an acid treatment in order to hydrolyze the magnesium-organic compound, the methoxy group undergoing ether scission at the same time; separating the resulting mixture of stereoisomers by chromatography; and reducing the tertiary alicyclic hydroxyl group catalytically with retention or inversion of the configuration. The 4-(4-R₁-cyclohexyl)-cyclohexanols can be prepared by catalytic hydrogenation under more vigorous conditions from the 4-(4-R₁-cyclohexyl)-phenols thus obtained.

The compounds of formula (I) are valuable components of liquid crystal dielectrics, which are used to prepare electro-optical display elements.

The dielectrics of this invention consist of two or more components including at least one of formula (I). The other components are preferably nematic or nematogenic substances of the classes of the azobenzenes, azoxybenzenes, biphenyls, Schiff's bases, especially benzylidene derivatives, phenylbenzoates, phenylcyclohexanes, optionally halogenated stilbenes, diphenylacetylene derivatives, diphenylnitrones and substituted cinnamic acids. The most important compounds which can be used as such additional components can be characterized by formula (VI)

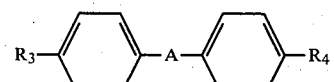
(VI)

in which A is
—CH=CH—

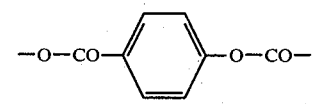

—CX'=CH—

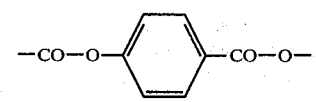

—CH=CX'—

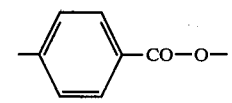

—C≡C—

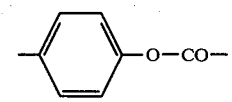

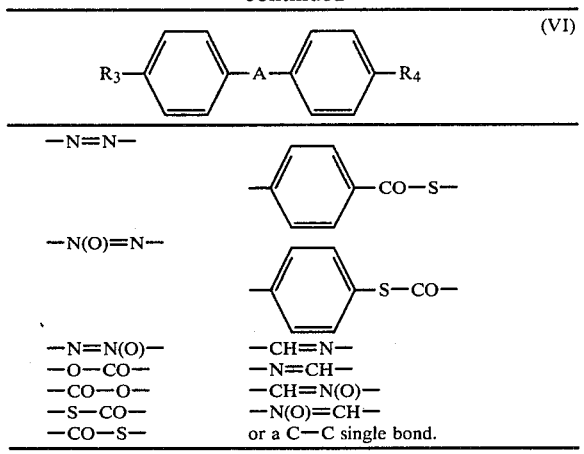

| | |
|---|---|
| —N=N— | |
| | —⌬—CO—S— |
| —N(O)=N— | |
| | —⌬—S—CO— |
| —N=N(O)— | —CH=N— |
| —O—CO— | —N=CH— |
| —CO—O— | —CH=N(O)— |
| —S—CO— | —N(O)=CH— |
| —CO—S— | or a C—C single bond. |

If A is —CO—O—, —O—CO— or a C—C single bond, one of the two phenyl rings can also be replaced by a trans-cyclohexyl ring. X' is halogen, preferably Cl. $R_3$ and $R_4$ are identical or different and can be alkyl, alkoxy, alkanoyl, alkanoyloxy or alkoxycarbonyloxy groups of up to 18, and preferably up to 8 carbon atoms; furthermore, one of these radicals can also be a cyano, nitro or isonitrile group. In most of these compounds, $R_3$ and $R_4$ are preferably different and one of the radicals is usually an alkyl or alkoxy group. However, a large number of other variants of the envisaged substituents are commonly used. Many such nematic substances are available commercially.

The dielectrics of this invention contain up to 50, usually 1–40, and preferably 5–40 parts by weight of one or more compounds of formula (I).

By means of the additives of this invention—depending on the nature and composition of the liquid crystal base substance—increases of 5° to 40° C. in the clear point are achieved without the viscosity of the base substance being changed in an undesirable manner. Thus, the switching time of display elements prepared with such dielectrics is not deleteriously affected. At the same time, the temperature dependence of the threshold voltage is surprisingly low in the dielectrics of this invention.

By means of suitable additives, the liquid crystal dielectrics of this invention can be so modified that they can be used in all of the types of displsy elements disclosed hitherto. Such additives are known to those skilled in the art and are described in detail in the relevant literature. For example, substances to change the dielectric anisotropy and/or the orientation of the nematic phases can be added. Such substances are described, for example, in German Offenlegungsschriften No. 2,209,127, 2,321,632 and 2,611,453.

When compared with the prior art compounds of U.S. Pat. Nos. 4,013,582 and 4,029,595, the compounds according to the invention exhibit a superior chemical stability, especially with respect to acidic conditions. Furthermore, it has surprisingly been discovered that liquid crystalline dielectrics comprising a liquid crystalline base material and at least one compund according to the invention, show a markedly lower temperature dependence of their viscosity, and of the threshold voltage in the twisted nematic cells than similar dielectrics comprising one or more of the above-mentioned prior art compounds.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

In the examples, m.p. denotes the melting point, S./N. denotes the transition point from a smectic to a nematic phase and Cl. denotes the clear point of a liquid crystal substance in degrees centigrade; boiling points are designated b.p.

EXAMPLE 1

A solution of 29.3 g of 4-(4-n-pentylcyclohexyl)-benzoyl chloride (prepared according to Example 1 of U.S. Ser. No. 823,308, filed on Aug. 10, 1977, now allowed) in 120 ml of toluene is added dropwise over the course of 2 hours to a boiling solution of 16.5 g of 4-n-pentylphenol and 10 ml of pyridine in 120 ml of toluene, with stirring. The reaction mixture is heated to the boil under reflux for an additional 3 hours and is then evaporated. 100 ml of water are added to the residue and the mixture is extracted three times with 150 ml of diethyl ether. The ether extracts are washed with 200 ml of water, 150 ml of 5% sodium bicarbonate solution and an additional 200 ml of water and dried over sodium sulphate. After distilling off the ether, the residual 4'-n-pentylphenyl 4-(4n-pentylcyclohexyl)-benzoate is recrystallized from ethanol;

m.p. 97° C., S./N. 133° C., Cl. 169° C.

The following compounds are prepared analogously:
4'-methylphenyl 4-(4-methylcyclohexyl)-benzoate,
4'-ethylphenyl 4-(4-methylcyclohexyl)-benzoate,
4'-n-propylphenyl 4-(4-methylcyclohexyl)-benzoate,
4'-n-butylphenyl 4-(4-methylcyclohexyl)-benzoate,
4'-n-pentylphenyl 4-(4-methylcyclohexyl)-benzoate,
4'-n-hexylphenyl 4-(4-methylcyclohexyl)-benzoate,
4'-n-heptylphenyl 4-(4-methylcyclohexyl)-benzoate,
4'-n-octylphenyl 4-(4-methylcyclohexyl)-benzoate,
4'-(2-methylbutyl)-phenyl 4-(4-methylcyclohexyl)-benzoate,
4'-cyanophenyl 4-(4-methylcyclohexyl)-benzoate.
  m.p. 153° C., Cl. 202° C.
4'-methoxyphenyl 4-(4-methylcyclohexyl)-benzoate,
4'-ethoxyphenyl 4-(4-methylcyclohexyl)-benzoate,
4'-n-propoxyphenyl 4-(4-methylcyclohexyl)-benzoate,
4'-n-butoxyphenyl 4-(4-methylcyclohexyl)-benzoate,
4'-n-pentyloxyphenyl 4-(4-methylcyclohexyl)-benzoate,
4'-n-hexyloxyphenyl 4-(4-methylcyclohexyl)-benzoate,
4'-acetoxyphenyl 4-(4-methylcyclohexyl)-benzoate,
4'-propionyloxyphenyl 4-(4-methylcyclohexyl)-benzoate,
4'-n-butanoyloxyphenyl 4-(4-methylcyclohexyl)-benzoate,
4'-n-pentanoyloxyphenyl 4-(4-methylcyclohexyl)-benzoate,
4'-n-hexanoyloxyphenyl 4-(4-methylcyclohexyl)-benzoate,
4'-n-heptanoyloxyphenyl 4-(4-methylcyclohexyl)-benzoate,
4'-methylphenyl 4-(4-ethylcyclohexyl)-benzoate.
  m.p. 114°, Cl. 162°.
4'-ethylphenyl 4-(4-ethylcyclohexyl)-benzoate.
  m.p. 94°, Cl. 149°.

4'-n-propylphenyl 4-(4-ethylcyclohexyl)-benzoate. m.p. 74°, Cl. 160°.
4'-n-butylphenyl 4-(4-ethylcyclohexyl)-benzoate. m.p. 83°, Cl. 148°.
4'-n-pentylphenyl 4-(4-ethylcyclohexyl)-benzoate. m.p. 79°, Cl. 152°.
4'-n-hexylphenyl 4-(4-ethylcyclohexyl)-benzoate. m.p. 75°, Cl. 141°.
4'-n-heptylphenyl 4-(4-ethylcyclohexyl)-benzoate,
4'-(2-methylbutyl)-phenyl 4-(4-ethylcyclohexyl)-benzoate,
4'-cyanophenyl 4-(4-ethylcyclohexyl)-benzoate. m.p. 113°, Cl. 215°.
4'-methoxyphenyl 4-(4-ethylcyclohexyl)-benzoate,
4'-ethoxyphenyl 4-(4-ethylcyclohexyl)-benzoate,
4'-n-propoxyphenyl 4-(4-ethylcyclohexyl)-benzoate,
4'-n-butoxyphenyl 4-(4-ethylcyclohexyl)-benzoate,
4'-n-pentyloxyphenyl 4-(4-ethylcyclohexyl)-benzoate,
4'-n-hexyloxyphenyl 4-(4-ethylcyclohexyl)-benzoate,
4'-acetoxyphenyl 4-(4-ethylcyclohexyl)-benzoate,
4'-propionyloxyphenyl 4-(4-ethylcyclohexyl)-benzoate,
4'-n-butanoyloxyphenyl 4-(4-ethylcyclohexyl)-benzoate,
4'-n-pentanoyloxyphenyl 4-(4-ethylcyclohexyl)-benzoate,
4'-n-hexanoyloxyphenyl 4-(4-ethylcyclohexyl)-benzoate,
4'-n-heptanoyloxyphenyl 4-(4-ethylcyclohexyl)-benzoate,
4'-methylphenyl 4-(4-n-propylcyclohexyl)-benzoate. m.p. 122°, Cl. 189°.
4'-ethylphenyl 4-(4-n-propylcyclohexyl)-benzoate. m.p. 105°, Cl. 177°.
4'-n-propylphenyl 4-(4-n-propylcyclohexyl)-benzoate. m.p. 78°, S./N. 87°, Cl. 186°.
4'-n-butylphenyl 4-(4-n-propylcyclohexyl)-benzoate. m.p. 88°, Cl. 165°.
4'-n-pentylphenyl 4-(4-n-propylcyclohexyl)-benzoate. m.p. 86°, Cl. 173°.
4'-n-hexylphenyl 4-(4-n-propylcyclohexyl)-benzoate. m.p. 72°, S./N. 103°, Cl. 165°.
4'-n-heptylphenyl 4-(4-n-propylcyclohexyl)-benzoate,
4'-(2-methylbutyl)-phenyl 4-(4-n-propylcyclohexyl)-benzoate,
4'-cyanophenyl 4-(4-n-propylcyclohexyl)-benzoate. m.p. 122°, Cl. 227°.
4'-methoxyphenyl 4-(4-n-propylcyclohexyl)-benzoate,
4'-ethoxyphenyl 4-(4-n-propylcyclohexyl)-benzoate,
4'-n-propoxyphenyl 4-(4-n-propylcyclohexyl)-benzoate,
4'-n-butoxyphenyl 4-(4-n-propylcyclohexyl)-benzoate,
4'-n-pentyloxyphenyl 4-(4-n-propylcyclohexyl)-benzoate,
4'-n-hexyloxyphenyl 4-(4-n-propylcyclohexyl)-benzoate,
4'-acetoxyphenyl 4-(4-n-propylcyclohexyl)-benzoate,
4'-propionyloxyphenyl 4-(4-n-propylcyclohexyl)-benzoate,
4'-n-butanoyloxyphenyl 4-(4-n-propylcyclohexyl)-benzoate,
4'-n-pentanoyloxyphenyl 4-(4-n-propylcyclohexyl)-benzoate,
4'-n-hexanoyloxyphenyl 4-(4-n-propylcyclohexyl)-benzoate,
4'-n-heptanoyloxyphenyl 4-(4-n-propylcyclohexyl)-benzoate,
4'-methylphenyl 4-(4-n-butylcyclohexyl)-benzoate. m.p. 115°, Cl. 180°.
4'-ethylphenyl 4-(4-n-butylcyclohexyl)-benzoate. m.p. 101°, Cl. 168°.
4'-n-propylphenyl 4-(4-n-butylcyclohexyl)-benzoate. m.p. 86°, S./N. 90°, Cl. 176°.
4'-n-butylphenyl 4-(4-n-butylcyclohexyl)-benzoate. m.p. 91°, S./N. 110°, Cl. 165°.
4'-n-pentylphenyl 4-(4-n-butylcyclohexyl)-benzoate. m.p. 83°, S./N. 109°, Cl. 165°.
4'-n-hexylphenyl 4-(4-n-butylcyclohexyl)-benzoate. m.p. 88°, S./N. 120°, Cl. 159°.
4'-n-heptylphenyl 4-(4-n-butylcyclohexyl)-benzoate,
4'-(2-methylbutyl)-phenyl 4-(4-n-butylcyclohexyl)-benzoate,
4'-cyanophenyl 4-(4-n-butylcyclohexyl)-benzoate. m.p. 104°, Cl. 224°.
4'-methoxyphenyl 4-(4-n-butylcyclohexyl)-benzoate,
4'-ethoxyphenyl 4-(4-n-butylcyclohexyl)-benzoate,
4'-n-propoxyphenyl 4-(4-n-butylcyclohexyl)-benzoate,
4'-n-butoxyphenyl 4-(4-n-butylcyclohexyl)-benzoate,
4'-n-pentyloxyphenyl 4-(4-n-butylcyclohexyl)-benzoate,
4'-n-hexyloxyphenyl 4-(4-n-butylcyclohexyl)-benzoate,
4'-acetoxyphenyl 4-(4-n-butylcyclohexyl)-benzoate,
4'-propionyloxyphenyl 4-(4-n-butylcyclohexyl)-benzoate,
4'-n-butanoyloxyphenyl 4-(4-n-butylcyclohexyl)-benzoate,
4'-n-pentanoyloxyphenyl 4-(4-n-butylcyclohexyl)-benzoate,
4'-n-hexanoyloxyphenyl 4-(4-n-butylcyclohexyl)-benzoate,
4'-methylphenyl 4-(4-n-pentylcyclohexyl)-benzoate. m.p. 108°, Cl. 183°.
4'-ethylphenyl 4-(4-n-pentylcyclohexyl)-benzoate. m.p. 90°, S./N. 106°, Cl. 171°.
4'-n-propylphenyl 4-(4-n-pentylcyclohexyl)-benzoate. m.p. 66°, S./N. 119°, Cl. 184°.
4'-n-butylphenyl 4-(4-n-pentylcyclohexyl)-benzoate. m.p. 74°, S./N. 132°, Cl. 169°.
4'-n-hexylphenyl 4-(4-n-pentylcyclohexyl)-benzoate. m.p. 103°, S./N. 138°, Cl. 163°.
4'-n-heptylphenyl 4-(4-n-pentylcyclohexyl)-benzoate,
4'-(2-methylbutyl)-phenyl 4-(4-n-pentylcyclohexyl)-benzoate,
4'-cyanophenyl 4-(4-n-pentylcyclohexyl)-benzoate. m.p. 108°, Cl. 217°.
4'-methoxyphenyl 4-(4-n-pentylcyclohexyl)-benzoate,
4'-ethoxyphenyl 4-(4-n-pentylcyclohexyl)-benzoate,
4'-n-propoxyphenyl 4-(4-n-pentylcyclohexyl)-benzoate,
4'-n-butoxyphenyl 4-(4-n-pentylcyclohexyl)-benzoate,
4'-n-pentyloxyphenyl 4-(4-n-pentylcyclohexyl)-benzoate,
4'-n-hexyloxyphenyl 4-(4-n-pentylcyclohexyl)-benzoate,
4'-acetoxyphenyl 4-(4-n-pentylcyclohexyl)-benzoate,
4'-propionyloxyphenyl 4-(4-n-pentylcyclohexyl)-benzoate,
4'-n-butanoyloxyphenyl 4-(4-n-pentylcyclohexyl)-benzoate,
4'-n-pentanoyloxyphenyl 4-(4-n-pentylcyclohexyl)-benzoate,
4'-n-hexanoyloxyphenyl 4-(4-n-pentylcyclohexyl)-benzoate,
4'-methylphenyl 4-(4-n-hexylcyclohexyl)-benzoate,
4'-ethylphenyl 4-(4-n-hexylcyclohexyl)-benzoate,
4'-n-propylphenyl 4-(4-n-hexylcyclohexyl)-benzoate,
4'-n-butylphenyl 4-(4-n-hexylcyclohexyl)-benzoate,
4'-n-pentylphenyl 4-(4-n-hexylcyclohexyl)-benzoate, 4'-n-hexylphenyl 4-(4-n-hexylcyclohexyl)-benzoate,
4'-(2-methylbutyl)-phenyl 4-(4-n-hexylcyclohexyl)-benzoate,
4'-cyanophenyl 4-(4-n-hexylcyclohexyl)-benzoate. m.p. 101°, Cl. 208°.
4'-methoxyphenyl 4-(4-n-hexylcyclohexyl)-benzoate,
4'-ethoxyphenyl 4-(4-n-hexylcyclohexyl)-benzoate,
4'-n-propoxyphenyl 4-(4-n-hexylcyclohexyl)-benzoate,
4'-n-butoxyphenyl 4-(4-n-hexylcyclohexyl)-benzoate,
4'-acetoxyphenyl 4-(4-n-hexylcyclohexyl)-benzoate,
4'-propionyloxyphenyl 4-(4-n-hexylcyclohexyl)-benzoate,
4'-n-butanoyloxyphenyl 4-(4-n-hexylcyclohexyl)-benzoate, 4'-n-pentanoyloxyphenyl 4-(4-n-hexylcyclohexyl)-benzoate,
4'-methylphenyl 4-(4-n-heptylcyclohexyl)-benzoate,
4'-ethylphenyl 4-(4-n-heptylcyclohexyl)-benzoate,
4'-n-propylphenyl 4-(4-n-heptylcyclohexyl)-benzoate,
4'-n-butylphenyl 4-(4-n-heptylcyclohexyl)-benzoate,
4'-n-pentylphenyl 4-(4-n-heptylcyclohexyl)-benzoate. m.p. 115°, S./N. 147°, Cl. 162°.
4'-(2-methylbutyl)-phenyl 4-(4-n-heptylcyclohexyl)-benzoate,
4'-cyanophenyl 4-(4-n-heptylcyclohexyl)-benzoate. m.p. 104°, Cl. 211°.
4'-methoxyphenyl 4-(4-n-heptylcyclohexyl)-benzoate,
4'-ethoxyphenyl 4-(4-n-heptylcyclohexyl)-benzoate,
4'-n-propoxyphenyl 4-(4-n-heptylcyclohexyl)-benzoate,
4'-n-butoxyphenyl 4-(4-n-heptylcyclohexyl)-benzoate,
4'-acetoxyphenyl 4-(4-n-heptylcyclohexyl)-benzoate,
4'-propionyloxyphenyl 4-(4-n-heptylcyclohexyl)-benzoate,
4'-n-butanoyloxyphenyl 4-(4-n-heptylcyclohexyl)-benzoate,
4'-n-pentanoyloxyphenyl 4-(4-n-heptylcyclohexyl)-benzoate,
4'-methylphenyl 4-(4-n-octylcyclohexyl)-benzoate,
4'-ethylphenyl 4-(4-n-octylcyclohexyl)-benzoate,
4'-n-propylphenyl 4-(4-n-octylcyclohexyl)-benzoate,
4'-n-butylphenyl 4-(4-n-octylcyclohexyl)-benzoate,
4'-(2-methylbutyl)-phenyl 4-(4-n-octylcyclohexyl)-benzoate,
4'-cyanophenyl 4-(4-n-octylcyclohexyl)-benzoate,
4'-methoxyphenyl 4-(4-n-octylcyclohexyl)-benzoate,
4'-ethoxyphenyl 4-(4-n-octylcyclohexyl)-benzoate,
4'-n-propoxyphenyl 4-(4-n-octylcyclohexyl)-benzoate,
4'-n-butoxyphenyl 4-(4-n-octylcyclohexyl)-benzoate,
4'-acetoxyphenyl 4-(4-n-octylcyclohexyl)-benzoate,
4'-propionyloxyphenyl 4-(4-n-octylcyclohexyl)-benzoate,
4'-n-butanoyloxyphenyl 4-(4-n-octylcyclohexyl)-benzoate,
4'-methylphenyl 4-[4-(2-methylbutyl)-cyclohexyl]-benzoate,
4'-ethylphenyl 4-[4-(2-methylbutyl)-cyclohexyl]-benzoate,
4'-n-propylphenyl 4-[4-(2-methylbutyl)-cyclohexyl]-benzoate,
4'-n-butylphenyl 4-[4-(2-methylbutyl)-cyclohexyl]-benzoate,
4'-n-pentylphenyl 4-[4-(2-methylbutyl)-cyclohexyl]-benzoate,
4'-n-hexylphenyl 4-[4-(2-methylbutyl)-cyclohexyl]-benzoate,
4'-n-heptylphenyl 4-[4-(2-methylbutyl)-cyclohexyl]-benzoate,
4'-n-octylphenyl 4-[4-(2-methylbutyl)-cyclohexyl]-benzoate,
4'-cyanophenyl 4-[4-(2-methylbutyl)-cyclohexyl]-benzoate,
4'-methoxyphenyl 4-[4-(2-methylbutyl)-cyclohexyl]-benzoate,
4'-ethoxyphenyl 4-[4-(2-methylbutyl)-cyclohexyl]-benzoate,
4'-n-propoxyphenyl 4-[4-(2-methylbutyl)-cyclohexyl]-benzoate,
4'-n-butoxyphenyl 4-[4-(2-methylbutyl)-cyclohexyl]-benzoate,
4'-n-pentyloxyphenyl 4-[4-(2-methylbutyl)-cyclohexyl]-benzoate,
4'-n-hexyloxyphenyl 4-[4-(2-methylbutyl)-cyclohexyl]-benzoate,
4'-acetoxyphenyl 4-[4-(2-methylbutyl)-cyclohexyl]-benzoate,
4'-propionyloxyphenyl 4-[4-(2-methylbutyl)-cyclohexyl]-benzoate,
4'-n-butanoyloxyphenyl 4-[4-(2-methylbutyl)-cyclohexyl]-benzoate,
4'-n-pentanoyloxyphenyl 4-[4-(2-methylbutyl)-cyclohexyl]-benzoate,
4'-n-hexanoyloxyphenyl 4-[4-(2-methylbutyl)-cyclohexyl]-benzoate,
4'-n-heptanoyloxyphenyl 4-[4-(2-methylbutyl)-cyclohexyl]-benzoate,
4'-methylcyclohexyl 4-(4-methylcyclohexyl)-benzoate,
4'-ethylcyclohexyl 4-(4-methylcyclohexyl)-benzoate. m.p. 112°, Cl. 100°.
4'-n-propylcyclohexyl 4-(4-methylcyclohexyl)-benzoate. m.p. 95°, Cl. 125°.
4'-n-butylcyclohexyl 4-(4-methylcyclohexyl)-benzoate. m.p. 75°, S./N. 83°, Cl. 115°.
4'-n-pentylcyclohexyl 4-(4-methylcyclohexyl)-benzoate. m.p. 88° Cl. 122°.
4'-n-hexylcyclohexyl 4-(4-methylcyclohexyl)-benzoate,
4'-n-heptylcyclohexyl 4-(4-methylcyclohexyl)-benzoate,
4'-n-octylcyclohexyl 4-(4-methylcyclohexyl)-benzoate,
4'-methylcyclohexyl 4-(4-ethylcyclohexyl)-benzoate,
4'-ethylcyclohexyl 4-(4-ethylcyclohexyl)-benzoate. m.p. 188°, Cl. 111°.
4'-n-propylcyclohexyl 4-(4-ethylcyclohexyl)-benzoate. m.p. 93°, Cl. 133°.
4'-n-butylcyclohexyl 4-(4-ethylcyclohexyl)-benzoate,
4'-n-pentylcyclohexyl 4-(4-ethylcyclohexyl)-benzoate. m.p. 68°, Cl. 128°.
4'-n-hexylcyclohexyl 4-(4-ethylcyclohexyl)-benzoate,
4'-n-heptylcyclohexyl 4-(4-ethylcyclohexyl)-benzoate,
4'-methylcyclohexyl 4-(4-n-propylcyclohexyl)-benzoate. m.p. 90°, Cl. 127.5°.
4'-ethylcyclohexyl 4-(4-n-propylcyclohexyl)-benzoate. m.p. 93°, Cl. 135°.
4'-n-propylcyclohexyl 4-(4-n-propylcyclohexyl)-benzoate. m.p. 92°, Cl. 158°.
4'-n-butylcyclohexyl 4-(4-n-propylcyclohexyl)-benzoate. m.p. 76°, Cl. 147°.
4'-n-pentylcyclohexyl 4-(4-n-propylcyclohexyl)-benzoate. m.p. 68°, S./N. 74°, Cl. 153°.
4'-n-hexylcyclohexyl 4-(4-n-propylcyclohexyl)-benzoate, 4'-n-heptylcyclohexyl 4-(4-n-propylcyclohexyl)-benzoate,
4'-methylcyclohexyl 4-(4-n-butylcyclohexyl)-benzoate,
4'-ethylcyclohexyl 4-(4-n-butylcyclohexyl)-benzoate.
  m.p. 76°, Cl. 125°.
4'-n-propylcyclohexyl 4-(4-n-butylcyclohexyl)-benzoate.
  m.p. 69°, Cl. 150°.
4'-n-butylcyclohexyl 4-(4-n-butylcyclohexyl)-benzoate.
  m.p. 81°, Cl. 143°.
4'-n-pentylcyclohexyl 4-(4-n-butylcyclohexyl)-benzoate,
  m.p. 62°, Cl. 147°.
4'-n-hexylcyclohexyl 4-(4-n-butylcyclohexyl)-benzoate,
4'-n-heptylcyclohexyl 4-(4-n-butylcyclohexyl)-benzoate.
  m.p. 55°, S./N. 77°, Cl. 138°.
4'-methylcyclohexyl 4-(4-n-pentylcyclohexyl)-benzoate.
  m.p. 67.5°, S./N. 70°, Cl. 123°.
4'-ethylcyclohexyl 4-(4-n-pentylcyclohexyl)-benzoate.
  m.p. 75°, Cl. 134°.
4'-n-propylcyclohexyl 4-(4-n-pentylcyclohexyl)-benzoate.
  m.p. 60°, Cl. 145°.
4'-n-butylcyclohexyl 4-(4-n-pentylcyclohexyl)-benzoate.
  m.p. 72°, S./N. 82°, Cl. 147°.
4'-n-pentylcyclohexyl 4-(4-n-pentylcyclohexyl)-benzoate.
  m.p. 70°, S./N. 90°, Cl. 156°.
4'-n-hexylcyclohexyl 4-(4-n-pentylcyclohexyl)-benzoate,
4'-n-heptylcyclohexyl 4-(4-n-pentylcyclohexyl)-benzoate,
4'-methylcyclohexyl 4-(4-n-hexylcyclohexyl)-benzoate,
4'-ethylcyclohexyl 4-(4-n-hexylcyclohexyl)-benzoate,
4'-n-propylcyclohexyl 4-(4-n-hexylcyclohexyl)-benzoate,
4'-n-butylcyclohexyl 4-(4-n-hexylcyclohexyl)-benzoate,
4'-n-pentylcyclohexyl 4-(4-n-hexylcyclohexyl)-benzoate,
4'-n-hexylcyclohexyl 4-(4-n-hexylcyclohexyl)-benzoate,
4'-n-heptylcyclohexyl 4-(4-n-hexylcyclohexyl)-benzoate.
  m.p. 65°, S./N. 115°, Cl. 141°.
4'-methylcyclohexyl 4-(4-n-heptylcyclohexyl)-benzoate,
4'-ethylcyclohexyl 4-(4-n-heptylcyclohexyl)-benzoate.
  m.p. 78°, Cl. 123°.
4'-n-propylcyclohexyl 4-(4-n-heptylcyclohexyl)-benzoate.
  m.p. 65°, S./N. 85°, Cl. 141°.
4'-n-butylcyclohexyl 4-(4-n-heptylcyclohexyl)-benzoate.
  m.p. 68°, S./N. 103°, Cl. 139°.
4'-n-pentylcyclohexyl 4-(4-n-heptylcyclohexyl)-benzoate.
  m.p. 60°, S./N. 100°, Cl. 135°.
4'-methylcyclohexyl 4-(4-n-octylcyclohexyl)-benzoate,
4'-ethylcyclohexyl 4-(4-n-octylcyclohexyl)-benzoate,
4'-n-propylcyclohexyl 4-(4-n-octylcyclohexyl)-benzoate,
4'-methylcyclohexyl 4-[4-(2-methylbutyl)-cyclohexyl]-benzoate,
4'-ethylcyclohexyl 4-[4-(2-methylbutyl)-cyclohexyl]-benzoate,
4'-n-propylcyclohexyl 4-(4-(2-methylbutyl)-cyclohexyl]-benzoate,
4'-n-butylcyclohexyl 4-[4-(2-methylbutyl)-cyclohexyl]-benzoate,
4'-n-pentylcyclohexyl 4-[4-(2-methylbutyl)-cyclohexyl]-benzoate,
4'-n-hexylcyclohexyl 4-[4-(2-methylbutyl)-cyclohexyl]-benzoate,
4'-n-heptylcyclohexyl 4-[4-(2-methylbutyl)-cyclohexyl]-benzoate,
4'-n-octylcyclohexyl 4-[4-(2-methylbutyl)-cyclohexyl]-benzoate,
4'-methylcyclohexyl 4-(4-methylcyclohexyl)-cyclohexanecarboxylate,
4'-ethylcyclohexyl 4-(4-methylcyclohexyl)-cyclohexanecarboxylate,
4'-n-propylcyclohexyl 4-(4-methylcyclohexyl)-cyclohexanecarboxylate,
4'-n-butylcyclohexyl 4-(4-methylcyclohexyl)-cyclohexanecarboxylate,
4'-n-pentylcyclohexyl 4-(4-methylcyclohexyl)-cyclohexanecarboxylate,
4'-n-hexylcyclohexyl 4-(4-methylcyclohexyl)-cyclohexanecarboxylate,
4'-n-heptylcyclohexyl 4-(4-methylcyclohexyl)-cyclohexancarboxylate,
4'-n-octylcyclohexyl 4-(4-methylcyclohexyl)-cyclohexanecarboxylate,
4'-methylcyclohexyl 4-(4-ethylcyclohexyl)-cyclohexanecarboxylate,
4'-ethylcyclohexyl 4-(4-ethylcyclohexyl)-cyclohexanecarboxylate,
4'-n-propylcyclohexyl 4-(4-ethylcyclohexyl)-cyclohexanecarboxylate,
4'-n-butylcyclohexyl 4-(4-ethylcyclohexyl)-cyclohexanecarboxylate,
4'-n-pentylcyclohexyl 4-(4-ethylcyclohexyl)-cyclohexanecarboxylate,
4'-n-hexylcyclohexyl 4-(4-ethylcyclohexyl)-cyclohexanecarboxylate,
4'-n-heptylcyclohexyl 4-(4-ethylcyclohexyl)-cyclohexanecarboxylate,
4'-methylcyclohexyl 4-(4-n-propylcyclohexyl)-cyclohexanecarboxylate,
4'-ethylcyclohexyl 4-(4-n-propylcyclohexyl)-cyclohexanecarboxylate,
4'-n-propylcyclohexyl 4-(4-n-propylcyclohexyl)-cyclohexanecarboxylate,
4'-n-butylcyclohexyl 4-(4-n-propylcyclohexyl)-cyclohexanecarboxylate,
4'-n-pentylcyclohexyl 4-(4-n-propylcyclohexyl)-cyclohexanecarboxylate,
4'-n-hexylcyclohexyl 4-(4-n-propylcyclohexyl)-cyclohexanecarboxylate,
4'-n-heptylcyclohexyl 4-(4-n-propylcyclohexyl)-cyclohexane-carboxylate.
  m.p. 54°, Cl. 182°.
4'-methylcyclohexyl 4-(4-n-butylcyclohexyl)-cyclohexanecarboxylate,
4'-ethylcyclohexyl 4-(4-n-butylcyclohexyl)-cyclohexanecarboxylate,
4'-n-propylcyclohexyl 4-(4-n-butylcyclohexyl)-cyclohexanecarboxylate,
4'-n-butylcyclohexyl 4-(4-n-butylcyclohexyl)-cyclohexanecarboxylate,
4'-n-pentylcyclohexyl 4-(4-n-butylcyclohexyl)-cyclohexanecarboxylate, 4'-n-hexylcyclohexyl 4-(4-n-butylcyclohexyl)-cyclohexanecarboxylate,
4'-n-heptylcyclohexyl 4-(4-n-butylcyclohexyl)-cyclohexanecarboxylate,
4'-methylcyclohexyl 4-(4-n-pentylcyclohexyl)-cyclohexanecarboxylate,
4'-ethylcyclohexyl 4-(4-n-pentylcyclohexyl)-cyclohexanecarboxylate,
4'-n-propylcyclohexyl 4-(4-n-pentylcyclohexyl)-cyclohexane-carboxylate. m.p. 64°, Cl. 182°.
4'-n-butylcyclohexyl 4-(4-n-pentylcyclohexyl)-cyclohexanecarboxylate,
4'-n-pentylcyclohexyl 4-(4-n-pentylcyclohexyl)-cyclohexane-carboxylate,
4'-n-hexylcyclohexyl 4-(4-n-pentylcyclohexyl)-cyclohexanecarboxylate,
4'-n-heptylcyclohexyl 4-(4-n-pentylcyclohexyl)-cyclohexane-carboxylate,
4'-methylcyclohexyl 4-(4-n-hexylcyclohexyl)-cyclohexanecarboxylate,
4'-ethylcyclohexyl 4-(4-n-hexylcyclohexyl)-cyclohexanecarboxylate,
4'-n-propylcyclohexyl 4-(4-n-hexylcyclohexyl)-cyclohexanecarboxylate,
4'-n-butylcyclohexyl 4-(4-n-hexylcyclohexyl)-cyclohexanecarboxylate,
4'-n-pentylcyclohexyl 4-(4-n-hexylcyclohexyl)-cyclohexanecarboxylate,
4'-methylcyclohexyl 4-(4-n-heptylcyclohexyl)-cyclohexanecarboxylate,
4'-ethylcyclohexyl 4-(4-n-heptylcyclohexyl)-cyclohexanecarboxylate,
4'-n-propylcyclohexyl 4-(4-n-heptylcyclohexyl)-cyclohexanecarboxylate,
4'-n-butylcyclohexyl 4-(4-n-heptylcyclohexyl)-cyclohexanecarboxylate,
4'-n-pentylcyclohexyl 4-(4-n-heptylcyclohexyl)-cyclohexanecarboxylate,
4'-methylcyclohexyl 4-(4-n-octylcyclohexyl)-cyclohexanecarboxylate,
4'-ethylcyclohexyl 4-(4-n-octylcyclohexyl)-cyclohexanecarboxylate,
4'-n-propylcyclohexyl 4-(4-n-octylcyclohexyl)-cyclohexanecarboxylate,
4'-methylcyclohexyl 4-[4-(2-methylbutyl)-cyclohexyl]-cyclohexane-carboxylate,
4'-ethylcyclohexyl 4-[4-(2-methylbutyl)-cyclohexyl]-cyclohexane-carboxylate,
4'-n-propylcyclohexyl 4-[4-(2-methylbutyl)-cyclohexyl]-cyclohexane-carboxylate,
4'-n-butylcyclohexyl 4-[4-(2-methylbutyl)-cyclohexyl]-cyclohexane-carboxylate,
4'-n-pentylcyclohexyl 4-[4-(2-methylbutyl)-cyclohexyl]-cyclohexane-carboxylate,
4'-n-hexylcyclohexyl 4-[4-(2-methylbutyl)-cyclohexyl]-cyclohexanecarboxylate,
4'-n-heptylcyclohexyl 4-[4-(2-methylbutyl)-cyclohexyl]-cyclo-hexanecarboxylate,
4'-n-octylcyclohexyl 4-[4-(2-methylbutyl)-cyclohexyl]-cyclo-hexanecarboxylate,
4'-(4-methylcyclohexyl)-phenyl 4-cyanobenzoate,
4'-(4-ethylcyclohexyl)-phenyl 4-cyanobenzoate,
4'-(4-n-propylcyclohexyl)-phenyl 4-cyanobenzoate. m.p. 160°, Cl. 254°
4'-(4-n-butylcyclohexyl)-phenyl 4-cyanobenzoate. m.p. 178°, Cl. 252°
4'-(4-n-pentylcyclohexyl)-phenyl 4-cyanobenzoate,
4'-(4-n-hexylcyclohexyl)-phenyl 4-cyanobenzoate,
4'-(4-n-heptylcyclohexyl)-phenyl 4-cyanobenzoate. m.p. 157°, S./N. 167°, Cl. 229°
4'-(4-n-octylcyclohexyl)-phenyl 4-cyanobenzoate,
4'-[4-(2-methylbutyl)-cyclohexyl]-phenyl 4-cyanobenzoate,
4'-(methylcyclohexyl)-cyclohexyl 4-cyanobenzoate,
4'-(4-ethylcyclohexyl)-cyclohexyl 4-cyanobenzoate,
4'-(4-n-propylcyclohexyl)-cyclohexyl 4-cyanobenzoate,
4'-(4-n-butylcyclohexyl)-cyclohexyl 4-cyanobenzoate,
4'-(4-n-pentylcyclohexyl)-cyclohexyl 4-cyanobenzoate,
4'-(4-n-hexylcyclohexyl)-cyclohexyl 4-cyanobenzoate,
4'-(4-n-heptylcyclohexyl)-cyclohexyl 4-cyanobenzoate,
4'-(4-n-octylcyclohexyl)-cyclohexyl 4-cyanobenzoate,
4'-[4-(2-methylbutyl)-cyclohexyl]-cyclohexyl 4-cyanobenzoate,
4-(4-methylcyclohexyl)-phenyl 4-methylcyclohexanecarboxylate,
4-(4-ethylcyclohexyl)-phenyl 4-methylcyclohexanecarboxylate,
4-(4-n-propylcyclohexyl)-phenyl 4-methylcyclohexanecarboxylate,
4-(4-n-butylcyclohexyl)-phenyl 4-methylcyclohexanecarboxylate,
4-(4-n-pentylcyclohexyl)-phenyl 4-methylcyclohexanecarboxylate,
4-(4-n-hexylcyclohexyl)-phenyl 4-methylcyclohexanecaraboxylate,
4-(4-n-heptylcyclohexyl)-phenyl 4-methylcyclohexanecarboxylate,
4-(4-methylcyclohexyl)-phenyl 4-ethylcyclohexanecarboxylate,
4-(4-ethylcyclohexyl)-phenyl 4-ethylcyclohexanecarboxylate,
4-(4-n-propylcyclohexyl)-phenyl 4-ethylcyclohexanecaboxylate,
4-(4-butylcyclohexyl)-phenyl 4-ethylcyclohexanecarboxylate,
4-(4-n-pentylcyclohexyl)-phenyl 4-ethylcyclohexanecarboxylate,
4-(4-n-hexylcyclohexyl)-phenyl 4-ethylcyclohexanecarboxylate,
4-(4-n-heptylcyclohexyl)-phenyl 4-ethylcyclohexanecarboxylate,
4-(4-methylcyclohexyl)-phenyl 4-n-propylcyclohexanecarboxylate,
4-(4-ethylcyclohexyl)-phenyl 4-n-propylcyclohexanecarboxylate,
4-(4-n-propylcyclohexyl)-phenyl 4-n-propylcyclohexanecarboxylate. m.p. 110°, Cl. 190°
4-(4-n-butylcyclohexyl)-phenyl 4-n-propylcyclohexanecarboxylate. m.p. 117°, Cl. 185°
4-(4-n-pentylcyclohexyl)-phenyl 4-n-propylcyclohexanecarboxylate,
4-(4-n-hexylcyclohexyl)-phenyl 4-n-propylcyclohexanecarboxylate,
4-(4-n-heptylcyclohexyl)-phenyl 4-n-propylcyclohexanecarboxylate,
4-(4-methylcyclohexyl)-phenyl 4-n-butylcyclohexanecarboxylate,
4-(4-ethylcyclohexyl)-phenyl 4-n-butylcyclohexanecarboxylate,
4-(4-n-propylcyclohexyl)-phenyl 4-n-butylcyclohexanecarboxylate,
4-(4-n-butylcyclohexyl)-phenyl 4-n-butylcyclohexanecarboxylate, 4-(4-n-pentylcyclohexyl)-pentyl 4-n-butylcyclohexanecarboxylate,
4-(4-n-hexylcyclohexyl)-phenyl 4-n-butylcyclohexanecarboxylate,
4-(4-n-heptylcyclohexyl)-phenyl 4-n-butylcyclohexanecarboxylate,
4-(4-methylcyclohexyl)-phenyl 4-n-pentylcyclohexanecarboxylate,
4-(4-ethylcyclohexyl)-phenyl 4-n-pentylcyclohexanecarboxylate,
4-(4-n-propylcyclohexyl)-phenyl 4-n-pentylcyclohexanecarboxylate. m.p. 42°, S./N. 128°, Cl. 187°
4-(4-n-butylcyclohexyl)-phenyl 4-n-pentylcyclohexanecarboxylate,
4-(4-n-pentylcyclohexyl)-pentyl 4-n-pentylcyclohexanecarboxylate,
4-(4-n-hexylcyclohexyl)-phenyl 4-n-pentylcyclohexanecarboxylate,
4-(4-n-heptylcyclohexyl)-pentyl 4-n-pentylcyclohexanecarboxylate. m.p. 32°, Cl. 180°
4-(4-methylcyclohexyl)-phenyl 4-n-hexylcyclohexanecarboxylate,
4-(4-ethylcyclohexyl)-phenyl 4-n-hexylcyclohexanecarboxylate,
4-(4-n-propylcyclohexyl)-phenyl 4-n-hexylcyclohexanecarboxylate,
4-(4-n-butylcyclohexyl)-phenyl 4-n-hexylcyclohexanecarboxylate,
4-(4-n-pentylcyclohexyl)-phenyl 4-n-hexylcyclohexanecaboxylate,
4-(4-n-hexylcyclohexyl)-phenyl 4-n-hexylcyclohexanecarboxylate,
4-(4-n-heptylcyclohexyl)-phenyl 4-n-hexylcyclohexanecarboxylate,
4-(4-methylcyclohexyl)-phenyl 4-n-heptylcyclohexanecarboxylate,
4-(4-ethylcyclohexyl)-phenyl 4-n-heptylcyclohexanecarboxylate,
4-(4-n-propylcyclohexyl)-phenyl 4-n-heptylcyclohexanecarboxylate,
4-(4-n-butylcyclohexyl)-phenyl 4-n-heptylcyclohexanecarboxylate,
4-(4-n-pentylcyclohexyl)-phenyl 4-n-heptylcyclohexanecarboxylate,
4-(4-n-hexylcyclohexyl)-phenyl 4-n-heptylcyclohexanecarboxylate and
4-(4-n-heptylcyclohexyl)-phenyl 4-n-heptylcyclohexanecarboxylate.

EXAMPLE 2

16.5 g of 4-n-propylbenzoic acid and 27.7 g of 4-(4-n-pentylcyclohexyl)-phenol are heated to the boil under reflux with 0.25 g of concentrated sulphuric acid and 0.15 g of boric acid in 250 ml of toluene for 24 hours in a round-bottomed flask provided with a water separator. About 0.8 ml of water is separated off azeotropically. The reaction mixture is washed three times with, in each case, 200 ml of water, once with 200 ml of 5% aqueous sodium bicarbonate solution and twice additionally with, in each case, 200 ml of water and dried over sodium sulphate. After distilling off the toluene, the resulting 4'-(4-n-pentylcyclohexyl)-phenyl 4-n-propylbenzoate is recrystallized from methanol.

The following compounds are prepared analogously:
4'-(4-methylcyclohexyl)-phenyl 4-methylbenzoate,
4'-(4-ethylcyclohexyl)-phenyl 4-methylbenzoate,
4'-(4-n-propylcyclohexyl)-phenyl 4-methylbenzoate,
4'-(4-n-butylcyclohexyl)-phenyl 4-methylbenzoate,
4'-(4-n-pentylcyclohexyl)-phenyl 4-methylbenzoate,
4'-(4-n-hexylcyclohexyl)-phenyl 4-methylbenzoate,
4'-(4-n-heptylcyclohexyl)-phenyl 4-methylbenzoate,
4'-(4-n-octylcyclohexyl)-phenyl 4-methylbenzoate,
4'-[4-(2-methylbutyl)-cyclohexyl]-phenyl 4-methylbenzoate,
4'-(4-methylcyclohexyl)-phenyl 4-ethylbenzoate
4'-(4-ethylcyclohexyl)-phenyl 4-ethylbenzoate,
4'-(4-n-propylcyclohexyl)-phenyl 4-ethylbenzoate,
4'-(4-n-butylcyclohexyl)-phenyl 4-ethylbenzoate,
4'-(4-n-pentylcyclohexyl)-phenyl 4-ethylbenzoate,
4'-(4-n-hexylcyclohexyl)-phenyl 4-ethylbenzoate,
4'-(4-n-heptylcyclohexyl)-phenyl 4-ethylbenzoate,
4'-(4-n-octylcyclohexyl)-phenyl 4-ethylbenzoate,
4'-[4-(2-methylbutyl)-cyclohexyl]-phenyl 4-ethylbenzoate,
4'-(4-methylcyclohexyl)-phenyl 4-n-propylbenzoate,
4'-(4-ethylcyclohexyl)-phenyl 4-n-propylbenzoate,
4'-(4-n-propylcyclohexyl)-phenyl 4-n-propylbenzoate,
4'-(4-n-butylcyclohexyl)-phenyl 4-n-propylbenzoate,
4'-(4-n-hexylcyclohexyl)-phenyl 4-n-propylbenzoate,
4'-(4-n-heptylcyclohexyl)-phenyl 4-n-propylbenzoate,
4'-(4-n-octylcyclohexyl)-phenyl 4-n-propylbenzoate,
4'-[4-(2-methylbutyl)-cyclohexyl]-phenyl 4-n-propylbenzoate,
4'-(4-methylcyclohexyl)-phenyl 4-n-butylbenzoate,
4'-(4-ethylcyclohexyl)-phenyl 4-n-butylbenzoate,
4'-(4-n-propylcyclohexyl)-phenyl 4-n-butylbenzoate,
4'-(4-n-butylcyclohexyl)-phenyl 4-n-butylbenzoate,
4'-(4-n-pentylcyclohexyl)-phenyl 4-n-butylbenzoate,
4'-(4-n-hexylcyclohexyl)-phenyl 4-n-butylbenzoate,
4'-(4-n-heptylcyclohexyl)-phenyl 4-n-butylbenzoate,
4'-(4-n-octylcyclohexyl)-phenyl 4-n-butylbenzoate,
4'-[4-(2-methylbutyl)-cyclohexyl]-phenyl 4-n-butylbenzoate,
4'-(4-methylcyclohexyl)-phenyl 4-n-pentylbenzoate,
4'-(4-ethylcyclohexyl)-phenyl 4-n-pentylbenzoate,
4'-(4-n-propylcyclohexyl)-phenyl 4-n-pentylbenzoate, m.p. 98°, Cl. 180°,
4'-(4-n-butylcyclohexyl)-phenyl 4-n-pentylbenzoate, m.p. 96°, Cl. 171°,
4'-(4-n-pentylcyclohexyl)-phenyl 4-n-pentylbenzoate,
4'-(4-n-hexylcyclohexyl)-phenyl 4-n-pentylbenzoate,
4'-(4-n-heptylcyclohexyl)-phenyl 4-n-pentylbenzoate m.p. 78°, S./N. 104°, Cl. 165°
4'-(4-n-octylcyclohexyl)-phenyl 4-n-pentylbenzoate,
4'-[4-(2-methylbutyl)-cyclohexyl]-phenyl 4-n-pentylbenzoate,
4'-(4-methylcyclohexyl)-phenyl4-n-hexylbenzoate,
4'-(4-ethylcyclohexyl)-phenyl 4-n-hexylbenzoate,
4'-(4-n-propylcyclohexyl)-phenyl 4-n-hexylbenzoate,
4'-(4-n-butylcyclohexyl)-phenyl 4-n-hexylbenzoate,
4'-(4-n-pentylcyclohexyl)-phenyl 4-n-hexylbenzoate,
4'-(4-n-hexylcyclohexyl)-phenyl 4-n-hexylbenzoate,
4'-(4-n-heptylcyclohexyl)-phenyl 4-n-hexylbenzoate,
4'-(4-n-octylcyclohexyl)-phenyl 4-n-hexylbenzoate,
4'-[4-(2-methylbutyl)-cyclohexyl]-phenyl 4-n-hexylbenzoate,
4'-(4-methylcyclohexyl)-phenyl 4-n-heptylbenzoate,
4'-(4-ethylcyclohexyl)-phenyl 4-n-heptylbenzoate,
4'-(4-n-propylcyclohexyl)-phenyl 4-n-heptylbenzoate,
4'-(4-n-butylcyclohexyl)-phenyl 4-n-heptylbenzoate,
4'-(4-n-pentylcyclohexyl)-phenyl 4-n-heptylbenzoate,
4'-(4-n-hexylcyclohexyl)-phenyl 4-n-heptylbenzoate,
4'-(4-n-heptylcyclohexyl)-phenyl 4-n-heptylbenzoate,
4'-(4-n-octylcyclohexyl)-phenyl 4-n-heptylbenzoate, 4'-[4-(2-methylbutyl)-cyclohexyl]-phenyl-4-n-heptylbenzoate,
4'-(4-methylcyclohexyl)-phenyl 4-n-octylbenzoate,
4'-(4-ethylcyclohexyl)-phenyl 4-n-octylbenzoate,
4'-(4-n-propylcyclohexyl)-phenyl 4-n-octylbenzoate,
4'-(4-n-butylcyclohexyl)-phenyl 4-n-octylbenzoate,
4'-(4-n-pentylcyclohexyl)-phenyl 4-n-octylbenzoate,
4'-(4-n-hexylcyclohexyl)-phenyl 4-n-octylbenzoate,
4'-(4-n-heptylcycohexyl)-phenyl 4-n-octylbenzoate,
4'-(4-n-octylcyclohexyl)-phenyl 4-n-octylbenzoate,
4'-[4-(2-methylbutyl)-cyclohexyl]-phenyl 4-n-octylbenzoate,
4'-(4-methylcyclohexyl)-phenyl 4-(1-methylbutyl)-benzoate,
4'-(4-ethylcyclohexyl)-phenyl 4-(1-methylbutyl)-benzoate,
4'-(4-n-propylcyclohexyl)-phenyl 4-(1-methylbutyl)-benzoate,
4'-(4-n-butylcyclohexyl)-phenyl 4-(1-methylbutyl)-benzoate,
4'-(4-n-pentylcyclohexyl)-phenyl 4-(1-methylbutyl)-benzoate,
4'-(4-n-hexylcyclohexyl)-phenyl 4-(1-methylbutyl)-benzoate,
4'-(4-n-heptylcyclohexyl)-phenyl 4-(1-methylbutyl)-benzoate,
4'-(4-n-octylcyclohexyl)-phenyl 4-(1-methylbutyl)-benzoate,
4'-methylphenyl 4-(4-methylcyclohexyl)-cyclohexanecarboxylate,
4'-ethylphenyl 4-(4-methylcyclohexyl)-cyclohexanecarboxylate,
4'-n-propylphenyl 4-(4-methylcyclohexyl)-cyclohexane-carboxylate,
4'-n-butylphenyl 4-(4-methylcyclohexyl)-cyclohexanecarboxylate,
4'-n-pentylphenyl 4-(4-methylcyclohexyl)-cyclohexane-carboxylate,
4'-n-hexylphenyl 4-(4-methylcyclohexyl)-cyclohexanecarboxylate,
4'-n-heptylphenyl 4-(4-methylcyclohexyl)-cyclohexane-carboxylate,
4'-n-octylphenyl 4-(4-methylcyclohexyl)-cyclohexanecarboxylate,
4'-(2-methylbutyl)-phenyl 4-(4-methylcyclohexyl)-cyclohexane-carboxylate,
4'-cyanophenyl 4-(4-methylcyclohexyl)-cyclohexanecarboxylate,
4'-methoxyphenyl 4-(4-methylcyclohexyl)-cyclohexanecarboxylate,
4'-ethoxyphenyl 4-(4-methylcyclohexyl)-cyclohexanecarboxylate,
4'-n-propoxyphenyl 4-(4-methylcyclohexyl)-cyclohexanecarboxylate,
4'-n-butoxyphenyl 4-(4-methylcyclohexyl)-cyclohexanecarboxylate,
4'-n-pentyloxyphenyl 4-(4-methylcyclohexyl)-cyclohexanecarboxylate,
4'-n-hexyloxyphenyl 4-(4-methylcyclohexyl)-cyclohexanecarboxylate,
4'-acetoxyphenyl 4-(4-methylcyclohexyl)-cyclohexanecarboxylate,
4'-propionyloxyphenyl 4-(4-methylcyclohexyl)-cyclohexanecarboxylate,
4'-n-butanoyloxyphenyl 4-(4-methylcyclohexyl)-cyclohexanecarboxylate,
4'-n-pentanoyloxyphenyl 4-(4-methylcyclohexyl)-cyclohexanecarboxylate,
4'-n-hexanoyloxyphenyl 4-(4-methylcyclohexyl)-cyclohexanecarboxylate,
4'-n-heptanoyloxyphenyl 4-(4-methylcyclohexyl)-cyclohexanecarboxylate,
4'-methylphenyl 4-(4-ethylcyclohexyl)-cyclohexanecarboxylate,
4'-ethylphenyl 4-(4-ethylcyclohexyl)-cyclohexanecarboxylate,
4'-n-propylphenyl 4-(4-ethylcyclohexyl)-cyclohexanecarboxylate,
4'-n-butylphenyl 4-(4-ethylcyclohexyl)-cyclohexanecarboxylate,
4'-n-pentylphenyl 4-(4-ethylcyclohexyl)-cyclohexanecarboxylate,
4'-n-hexylphenyl 4-(4-ethylcyclohexyl)-cyclohexanecarboxylate,
4'-n-heptylphenyl 4-(4-ethylcyclohexyl)-cyclohexanecarboxylate,
4'-(2-methylbutyl)-phenyl 4-(4-ethylcyclohexyl)-cyclohexanecarboxylate,
4'-cyanophenyl 4-(4-ethylcyclohexyl)-cyclohexanecarboxylate,
4'-methoxyphenyl 4-(4-ethylcyclohexyl)-cyclohexanecarboxylate,
4'-ethoxyphenyl 4-(4-ethylcyclohexyl)-cyclohexanecarboxylate,
4'-n-propoxyphenyl 4-(4-ethylcyclohexyl)-cyclohexanecarboxylate,
4'-n-butoxyphenyl 4-(4-ethylcyclohexyl)-cyclohexanecarboxylate,
4'-n-pentyloxyphenyl 4-(4-ethylcyclohexyl)-cyclohexanecarboxylate,
4'-n-hexyloxyphenyl 4-(4-ethylcyclohexyl)-cyclohexanecarboxylate,
4'-acetoxyphenyl 4-(4-ethylcyclohexyl)-cyclohexanecarboxylate,
4'-propionyloxyphenyl 4-(4-ethylcyclohexyl)-cyclohexanecarboxylate,
4'-butanoyloxyphenyl 4-(4-ethylcyclohexyl)-cyclohexanecarboxylate,
4'-n-pentanoyloxyphenyl 4-(4-ethylcyclohexyl)-cyclohexanecarboxylate,
4-n-hexanoyloxyphenyl 4-(4-ethylcyclohexyl)-cyclohexanecarboxylate,
4'-n-heptanoyloxyphenyl 4-(4-ethylcyclohexyl)-cyclohexanecarboxylate,
4'-methylphenyl 4-(4-n-propylcyclohexyl)-cyclohexanecarboxylate,
4'-ethylphenyl 4-(4-n-propylcyclohexyl)-cyclohexanecarboxylate,
4'-n-propylphenyl 4-(4-n-propylcyclohexyl)-cyclohexanecarboxylate,
m.p. 60°, S./N. 152°, Cl. 203°.
4'-n-butylphenyl 4-(4-n-propylcyclohexyl)-cyclohexanecarboxylate,
4'-n-pentylphenyl 4-(4-n-propylcyclohexyl)-cyclohexanecarboxylate,
m.p. 34°, S./N. 159°, Cl. 192°.
4'-n-hexylphenyl 4-(4-n-propylcyclohexyl)-cyclohexanecarboxylate,
4'-n-heptylphenyl 4-(4-n-propylcyclohexyl)-cyclohexanecarboxylate,
4'-(2-methylbutyl)-phenyl 4-(4-n-propylcyclohexyl)-cyclohexanecarboxylate,
4'-cyanophenyl 4-(4-n-propylcyclohexyl)-cyclohexanecarboxylate.
m.p. 93°, Cl. 210°.

4'-methoxyphenyl 4-(4-n-propylcyclohexyl)-cyclohexanecarboxylate,
4'-ethoxyphenyl 4-(4-n-propylcyclohexyl)-cyclohexanecarboxylate,
4'-n-propoxyphenyl 4-(4-n-propylcyclohexyl)-cyclohexanecarboxylate,
4'-n-butoxyphenyl 4-(4-n-propylcyclohexyl)-cyclohexanecarboxylate,
4'-n-pentyloxyphenyl 4-(4-n-propylcyclohexyl)-cyclohexanecarboxylate,
4'-n-hexyloxyphenyl 4-(4-n-propylcyclohexyl)-cyclohexanecarboxylate,
4'-acetoxyphenyl 4-(4-n-propylcyclohexyl)-cyclohexanecarboxylate,
4'-propionyloxyphenyl 4-(4-n-propylcyclohexyl)-cyclohexanecarboxylate,
4'-n-butanoyloxyphenyl 4-(4-n-propylcyclohexyl)-cyclohexanecarboxylate,
4'-n-pentanoyloxyphenyl 4-(4-n-propylcyclohexyl)-cyclohexanecarboxylate,
4'-n-hexanoyloxyphenyl 4-(4-n-propylcyclohexyl)-cyclohexanecarboxylate,
4'-n-heptanoyloxyphenyl 4-(4-n-propylcyclohexyl)-cyclohexanecarboxylate,
4'-methylphenyl 4-(4-n-butylcyclohexyl)-cyclohexanecarboxylate,
4'-ethylphenyl 4-(4-n-butylcyclohexyl)-cyclohexanecarboxylate,
4'-n-propylphenyl 4-(4-n-butylcyclohexyl)-cyclohexanecarboxylate;
4'-n-butylphenyl 4-(4-n-butylcyclohexyl)-cyclohexane carboxylate
4'-n-pentylphenyl 4-(4-n-butylcyclohexyl)-cyclohexane carboxylate,
4'-n-hexylphenyl 4-(4-n-butylcyclohexyl)-cyclohexanecarboxylate,
4'-n-heptylphenyl 4-(4-n-butylcyclohexyl)-cyclohexanecarboxylate,
4'-(2-methylbutyl)-phenyl 4-(4-n-butylcyclohexyl)-cyclohexanecarboxylate,
4'-cyclophenyl 4-(4-n-butylcyclohexyl)cyclohexanecarboxylate,
4'-methoxyphenyl 4-(4-n-butylcyclohexyl)-cyclohexanecarboxylate,
4'-ethoxyphenyl 4-(4-n-butylcyclohexyl)-cyclohexanecarboxylate,
4'-n-propoxyphenyl 4-(4-n-butylcyclohexyl-cyclohexanecarboxylate,
4'-n-butoxyphenyl 4-(4-n-butylcyclohexyl)-cyclohexanecarboxylate,
4'-n-pentyloxyphenyl 4-(4-n-butylcyclohexyl)-cyclohexanecaroxylate,
4'-hexyloxyphenyl 4-(4-n-butylcyclohexyl)-cyclohexanecarboxylate,
4'-acetoxyphenyl 4-(4-n-butylcyclohexyl)-cyclohexanecarboxylate,
4'-propionyloxyphenyl 4-(4-n-butylcyclohexyl)-cyclohexanecarboxylate,
4'-n-butanoyloxyphenyl 4-(4-n-butylcyclohexyl)-cyclohexanecarboxylate,
4'-n-pentanoyloxyphenyl 4-(4-n-butylcyclohexyl)cyclohexanecarboxylate,
4'-n-hexanoyloxyphenyl 4-(4-n-butylcyclohexyl)-cyclohexanecarboxylate,
4'-methylphenyl 4-(4-n-pentylcyclohexyl)-cyclohexanecarboxylate,
4'-ethylphenyl 4-(4-n-pentylcyclohexyl)-cyclohexanecarboxylate,
4'-n-propylphenyl 4-(4-n-pentylcyclohexyl)-cyclohexanecarboxylate,
4'-n-butylphenyl 4-(4-n-pentylcyclohexyl)-cyclohexanecarboxylate,
4'-n-pentylphenyl 4-(4-n-pentylcyclohexyl)-cyclohexanecarboxylate,
4'-n-hexylphenyl 4-(4-n-pentylcyclohexyl)-cyclohexanecarboxylate,
4'-n-heptylphenyl 4-(4-n-pentylcyclohexyl)-cyclohexanecarboxylate,
4'-(2-methylbutyl)-phenyl 4-(4-n-pentylcyclohexyl)-cyclohexanecarboxylate,
4'-cyanophenyl 4-(4-n-pentylcyclohexyl)-cyclohexanecarboxylate
m.p. 92°, Cl, 232°.
4'-methoxyphenyl 4-(4-n-pentylcyclohexyl)-cyclohexanecarboxylate,
4'-ethoxyphenyl 4-(4-n-pentylcyclohexyl)-cyclohexanecarboxylate,
4'-n-propoxyphenyl 4-(4-n-pentylcyclohexyl)-cyclohexanecarboxylate,
4'-n-butoxyphenyl 4-(4-n-pentylcyclohexyl)-cyclohexanecarboxylate,
4'-n-pentyloxyphenyl 4-(4-n-pentylcyclohexyl)-cyclohexanecarboxylate,
4'-n-hexyloxyphenyl 4-(4-n-pentylcyclohexyl)-cyclohexanecarboxylate,
4'-acetoxyphenyl 4-(4-n-pentylcyclohexyl)-cyclohexanecarboxylate,
4'-propionyloxyphenyl 4-(4-n-pentylcyclohexyl)-cyclohexanecarboxylate,
4'-n-butanoyloxyphenyl 4-(4-n-pentylcyclohexyl)-cyclohexanecarboxylate,
4'-n-pentanoyloxyphenyl 4-(4-n-pentylcyclohexyl)-cyclohexanecarboxylate,
4'-n-hexanoyloxyphenyl 4-(4-n-pentylcyclohexyl)-cyclohexanecarboxylate,
4'-methylphenyl 4-(4-n-hexylcyclohexyl)-cyclohexanecarboxylate,
4'-ethylphenyl 4-(4-n-hexylcyclohexyl)-cyclohexanecarboxylate,
4'-n-propylphenyl 4-(4-n-hexylcyclohexyl)-cyclohexanecarboxylate,
4'-n-butylphenyl 4-(4-n-hexylcyclohexyl)-cyclohexanecarboxylate,
4'-n-pentylphenyl 4-(4-n-hexylcyclohexyl)-cyclohexanecarboxylate,
4'-n-hexylphenyl 4-(4-n-hexylcyclohexyl)-cyclohexanecarboxylate,
4'-(2-methylbutyl)-phenyl 4-(4-n-hexylcyclohexyl)-cyclohexanecarboxylate,
4'-cyanophenyl 4-(4-n-hexylcyclohexyl)-cyclohexanecarboxylate,
4'-methoxyphenyl 4-(4-n-hexylcyclohexyl)-cyclohexanecarboxylate,
4'-ethoxyphenyl 4-(4-n-hexylcyclohexyl)-cyclohexanecarboxylate,
4'-n-propoxyphenyl 4-(4-n-hexylcyclohexyl)-cyclohexanecarboxylate,
4'-n-butoxyphenyl 4-(4-n-hexylcyclohexyl)-cyclohexanecarboxylate,
4'-acetoxyphenyl 4-(4-n-hexylcyclohexyl)-cyclohexanecarboxylate,
4'-propionyloxyphenyl 4-(n-hexylcyclohexyl)-cyclohexanecarboxylate,
4'-n-butanoyloxyphenyl 4-(4-n-hexylcyclohexyl)-cyclohexanecarboxylate, 4'-n-pentanoyloxyphenyl 4-(4-n-hexylcyclohexyl)-cyclohexanecarboxylate,
4'-methylphenyl 4-(4-n-heptylcyclohexyl)-cyclohexanecarboxylate,
4'-ethylphenyl 4-(4-n-heptylcyclohexyl)-cyclohexanecarboxylate,
4'-n-propylphenyl 4-(4-n-heptylcyclohexyl)-cyclohexanecarboxylate,
4'-n-butylphenyl 4-(4-n-heptylcyclohexyl)-cyclohexanecarboxylate,
4'-n-pentylphenyl 4-(4-n-heptylcyclohexyl)-cyclohexanecarboxylate,
4'-(2-methylbutyl)-phenyl 4-(4-n-heptylcyclohexyl)-cyclohexanecarboxylate,
4'-cyanophenyl 4-(4-n-heptylcyclohexyl)-cyclohexanecarboxylate. m.p. 90°, S./N. 118°, Cl. 222°.
4'-methoxyphenyl 4-(4-n-heptylcyclohexyl)-cyclohexanecarboxylate,
4'-ethoxyphenyl 4-(4-n-heptylcyclohexyl)-cyclohexanecarboxylate,
4'-n-propoxyphenyl 4-(4-n-heptylcyclohexyl)-cyclohexanecarboxylate,
4'-n-butoxyphenyl 4-(4-n-heptylcyclohexyl)-cyclohexanecarboxylate,
4'-acetoxyphenyl 4-(4-n-heptylcyclohexyl)-cyclohexanecarboxylate,
4'-propionyloxyphenyl 4-(4-n-heptylcyclohexyl)-cyclohexanecarboxylate,
4'-n-butanoyloxyphenyl 4-(4-n-heptylcyclohexyl)-cyclohexanecarboxylate,
4'-n-pentanoyloxyphenyl 4-(4-n-heptylcyclohexyl)-cyclohexanecarboxylate,
4'-methylphenyl 4-(4-n-octylcyclohexyl)-cyclohexanecarboxylate,
4'-ethylphenyl 4-(4-n-octylcyclohexyl)-cyclohexanecarboxylate,
4'-n-propylphenyl 4-(4-n-octylcyclohexyl)-cyclohexanecarboxylate,
4'-n-butylphenyl 4-(4-n-octylcyclohexyl)-cyclohexanecarboxylate,
4'-(2-methylbutyl)-phenyl 4-(4-n-octylcyclohexyl)-cyclohexanecarboxylate,
4'-cyanophenyl 4-(4-n-octylcyclohexyl)-cyclohexanecarboxylate,
4'-methoxyphenyl 4-(4-n-octylcyclohexyl)-cyclohexanecarboxylate,
4'-ethoxyphenyl 4-(4-n-octylcyclohexyl)-cyclohexanecarboxylate,
4'-n-propoxyphenyl 4-(4-n-octylcyclohexyl)-cyclohexanecarboxylate,
4'-n-butoxyphenyl 4-(4-n-octylcyclohexyl)-cyclohexanecarboxylate,
4'-acetoxyphenyl 4-(4-n-octylcyclohexyl)-cyclohexanecarboxylate,
4'-propionyloxyphenyl 4-(4-n-octylcyclohexyl)-cyclohexanecarboxylate,
4'-n-butanoyloxyphenyl 4-(4-n-octylcyclohexyl)-cyclohexanecarboxylate,
4'-methylphenyl 4-[4-(2-methylbutyl)-cyclohexyl]-cyclohexanecarboxylate,
4'-ethylphenyl 4-[4-(2-methylbutyl)-cyclohexyl]-cyclohexanecarboxylate,
4'-n-propylphenyl 4-[4-(2-methylbutyl)-cyclohexyl]-cyclohexanecarboxylate,
4'-n-butylphenyl 4-[4-(2-methylbutyl)-cyclohexyl]-cyclohexanecarboxylate,
4'-n-pentylphenyl 4-[4-(2-methylbutyl)-cyclohexyl]-cyclohexanecarboxylate,
4'-n-hexylphenyl 4-[4-(2-methylbutyl)-cyclohexyl]-cyclohexanecarboxylate,
4'-n-heptylphenyl 4-[4-(2-methylbutyl)-cyclohexyl]-cyclohexanecarboxylate,
4'-n-octylphenyl 4-[4-(2-methylbutyl)-cyclohexyl]-cyclohexanecarboxylate,
4'-cyanophenyl 4-[4-(2-methylbutyl)-cyclohexyl]-cyclohexanecarboxylate,
4'-methoxyphenyl 4-[4-(2-methylbutyl)-cyclohexyl]-cyclohexanecarboxylate,
4'-ethoxyphenyl 4-[4-(2-methylbutyl)-cyclohexyl]-cyclohexanecarboxylate,
4'-n-propoxyphenyl 4-[4-(2-methylbutyl)-cyclohexyl]-cyclohexanecarboxylate,
4'-n-butoxyphenyl 4-[4-(2-methylbutyl)-cyclohexyl]-cyclohexanecarboxylate,
4'-n-pentyloxyphenyl 4-[4-(2-methylbutyl)-cyclohexyl]-cyclohexanecarboxylate,
4'-n-hexyloxyphenyl 4-[4-(2-methylbutyl)-cyclohexyl]-cyclohexanecarboxylate,
4'-acetoxyphenyl 4-[4-(2-methylbutyl)-cyclohexyl]-cyclohexanecarboxylate,
4'-propionyloxyphenyl 4-[4-(2-methylbutyl)-cyclohexyl]-cyclohexanecarboxylate,
4'-n-butanoyloxyphenyl 4-[4-(2-methylbutyl)-cyclohexyl]-cyclohexanecarboxylate,
4'-n-pentanoyloxyphenyl 4-[4-(2-methylbutyl)-cyclohexyl]-cyclohexanecarboxylate,
4'-n-hexanoyloxyphenyl 4-[4-(2-methylbutyl)-cyclohexyl]-cyclohexanecarboxylate and
4'-n-heptanoyloxyphenyl 4-[4-(2-methylbutyl)-cyclohexyl]-cyclohexanecarboxylate.

The examples which follow relate to liquid crystal dielectrics according to the invention:

EXAMPLE 3

A mixture of 55% of 4'-n-propylphenyl 4-n-hexanoyloxybenzoate and 45% of 4'-n-heptylphenyl 4-n-hexanoyloxybenzoate has a m.p. of 20° and a Cl. of 56°. A dielectric of 94% of this base mixture and 6% of 4'-cyanophenyl 4-(4-n-pentylcyclohexyl)-cyclohexane-1-carboxylate, according to this invention, has a m.p. below 20° (a precise measurement is very difficult because supercooling phenomena arise) and a Cl. of 66.5°.

EXAMPLE 4

4-n-Pentyl-4'-cyanobiphenyl has a m.p. of 22.5° and a Cl. of 35°. On the addition of 10% (based on the total weight of the mixture) of 4'-n-heptylcyclohexyl 4-(4-n-hexylcyclohexyl)-benzoate according to this invention the m.p. falls to 22° while the Cl. rises to 44.5°.

EXAMPLE 5

A mixture of 67% of 4-n-pentylphenyl anisate and 33% of 4'-n-pentylphenyl 4-n-hexyloxybenzoate has a m.p. of 16° and a Cl. of 49°. A dielectric of 90% of this base mixture and 10% of 4'-n-pentylphenyl 4-(4-n-heptylcyclohexyl)benzoate according to this invention has a m.p. of about 10° and a Cl. of 61°.

EXAMPLE 6

4-(4-n-Heptylcyclohexyl)-benzonitrile has a m.p. of 30° and a Cl. of 57°. On the addition of 20% of 4'-cyanophenyl 4-(4-n-heptylcyclohexyl)-benzoate according to this invention, the melting point is virtually unchanged while the clear point rises to 79°.

EXAMPLE 7

A mixture of equal parts by weight of 4-n-pentyl-4'-cyanobiphenyl and 4-n-heptyl-4'-cyanobiphenyl has a Cl. of 38.5°. On the addition of 10% of 4'-n-pentylphenyl 4-(4-n-heptylcyclohexyl)-benzoate according to this invention, the Cl. is raised to 47°.

EXAMPLE 8

A mixture of 19% of 4-(4-n-propylcyclohexyl)-benzonitrile, 28% of 4-(4-n-pentylcyclohexyl)-benzonitrile, 20% of 4-(4-n-heptylcyclohexyl)-benzonitrile, 12% of 4-(4-n-pentylcyclohexyl)-4'-cyanobiphenyl, 11% of 4'-n-propyl-phenyl 4-(4-n-propylcyclohexyl)-benzoate and 10% of 4'-n-propylcyclohexyl 4-(4-n-propylcyclohexyl)-benzoate has the exceptionally broad nematic range from $-10°$ to $+86°$ and a viscosity of 36 cP.

EXAMPLE 9

A mixture of 24% of 4-(4-n-propylcyclohexyl)-benzonitrile, 35% of 4-(4-n-pentylcyclohexyl)-benzonitrile, 13% of 4'-n-propylphenyl 4-(4-n-propylcyclohexyl)-benzoate, 12% of 4'-n-propylcyclohexyl 4-(4-n-propylcyclohexyl)-benzoate and 16% of 4'-n-propylcyclohexyl 4-(4-n-pentylcyclohexyl)-benzoate has a nematic range from $-5°$ to $+86°$ and a viscosity of 42 cP. Also, the temperature dependence of the threshold voltage is very low.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A cyclohexane derivative of the formula

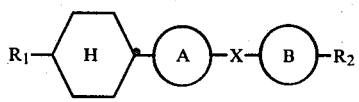

wherein
the rings A and B are identical or different and are each a 1,4-disubstituted phenyl or 1,4-trans-disubstituted cyclohexyl ring;
X is —CO—O— or —O—CO—;
R₁ is alkyl of 1–8 carbon atoms;
and R₂ is alkyl of 1–8 carbon atoms, and when the ring B is phenyl, R₂ is alkyl, alkoxy or alkanoyloxy, each of up to 8 carbon atoms, or —CN.

2. A cyclohexane derivative of claim 1, of the formula

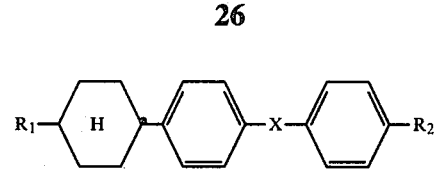

wherein
X is —CO—O— or —O—CO—, R₁ is alkyl of 1–8 carbon atoms and,
R₂ is alkyl, alkoxy or alkanoyloxy, each of up to 8 carbon atoms or —CN.

3. A cyclohexane derivative of claim 1 of the formula

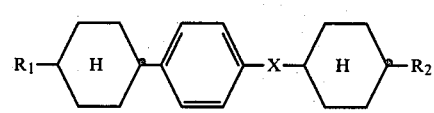

wherein
X is —CO—O— or —O—CO, and,
R₁ and R₂, which are identical or different, are each alkyl of 1–8 carbon atoms.

4. A cyclohexane derivative of claim 1, of the formula

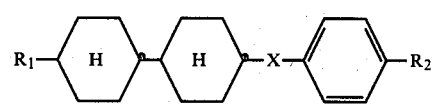

wherein
X is —CO—O— or —O—CO—,
R₁ is alkyl of 1–8 carbon atoms and R₂ is alkyl, alkoxy or alkanoyloxy each of up to 8 carbon atoms or —CN.

5. A cyclohexane derivative of claim 1, of the formula (Id)

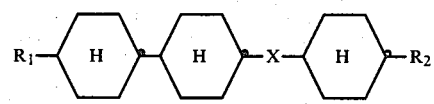

wherein
X is —CO—O— or —O—CO— and,
R₁ and R₂, which are identical or different, are alkyl of 1–8 carbon atoms.

6. A cyclohexane derivative of claim 1 wherein X is —CO—O—.

7. A cyclohexane derivative of claim 1, wherein R₁ is straight-chain alkyl of 1–6 carbon atoms.

8. A cyclohexane derivative of claim 1, wherein R₂ is straight-chain alkyl of 1–6 carbon atoms.

9. A cyclohexane derivative of claim 1, 2 or 4, wherein R₂ is —CN.

10. A dielectric for a liquid crystal display element comprising at least two liquid crystal components, wherein at least one of these components is a cyclohexane derivative of claim 1.

11. The dielectric of claim 10, comprising 1–40% by weight of at least one cyclohexane derivative of claim 1.

12. In an electro-optic cell comprising a liquid crystal dielectric, the improvement wherein the dielectric comprises a cyclohexane derivative of claim 1.

* * * * *